March 18, 1930. E. B. CARNS 1,750,832
WING CONSTRUCTION FOR AIRCRAFT
Filed April 22, 1927
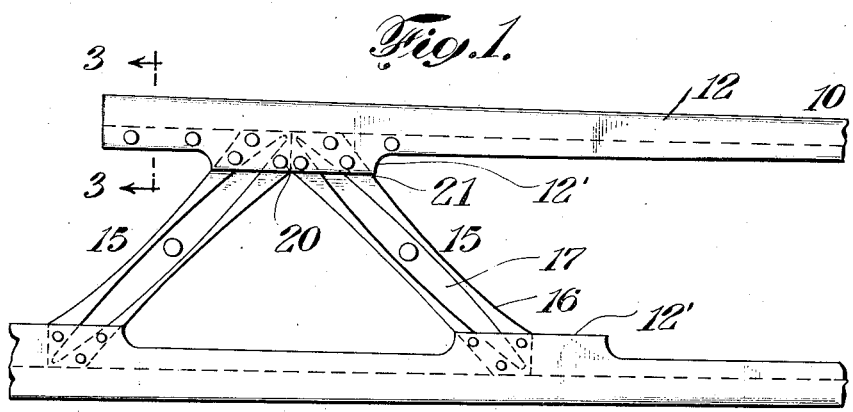
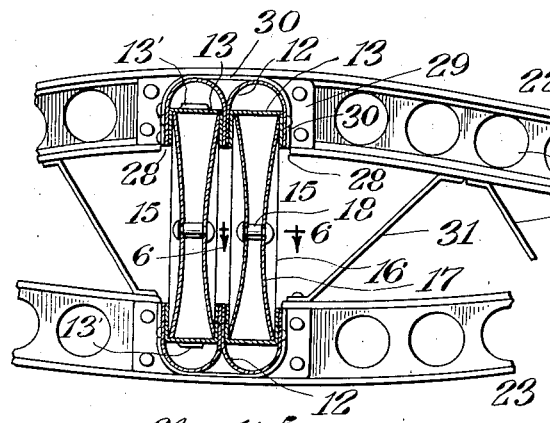
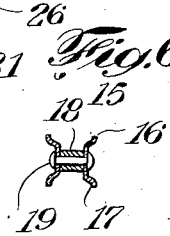
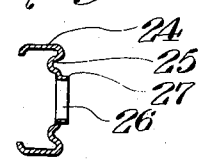
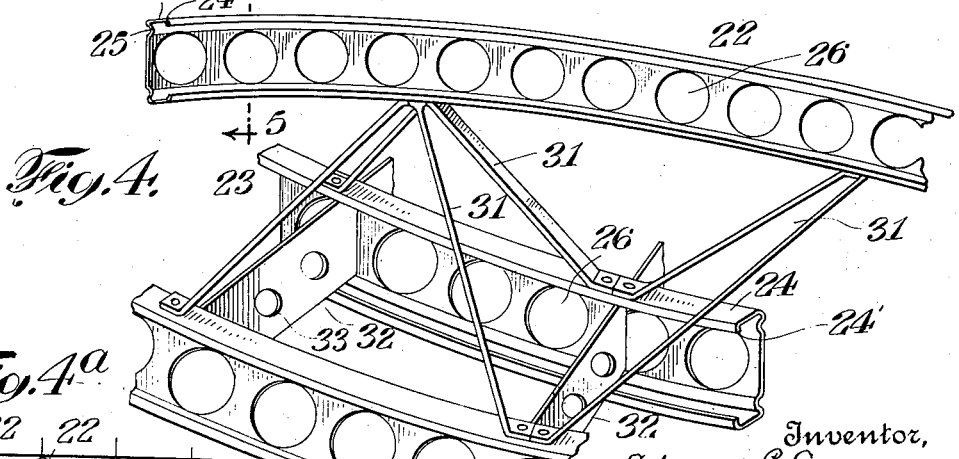

Patented Mar. 18, 1930

1,750,832

UNITED STATES PATENT OFFICE

EDMUND B. CAIRNS, OF NEW YORK, N. Y., ASSIGNOR TO CAIRNS DEVELOPMENT COMPANY, OF WILMINGTON, DELAWARE, A CORPORATION OF DELAWARE

WING CONSTRUCTION FOR AIRCRAFT

Application filed April 22, 1927. Serial No. 185,844.

My invention relates to improvements in wing construction for aircraft and the general object of the invention is to improve the wing construction by making and disposing of the component parts in such a manner as to obtain the maximum of strength and rigidity with the minimum of weight.

Owing to the fact that cold riveting of sheet metal is not altogether satisfactory for some sizes of wings, my invention is intended to produce a structure in which the parts can be made of properly shaped sheet metal and with these parts disposed so that they can be hot riveted, if desired.

My invention is further intended to produce a wing construction in which the spars are simply made of greater strength and are disposed so that they can be very easily and at the same time firmly and rigidly connected with the ribs of the wing. The spars, in particular, are constructed of sheet metal stampings, in which the cord members comprise channels shaped for ease of manufacture and stress resisting structure, and sheet metal struts connect the cord members of the spars to form light but very strong trussing supports.

My invention comprises other details of construction intended to produce the general effect above outlined, and these features will be understood clearly from the description which follows:

Reference is to be had to the accompanying drawings in which similar reference characters represent the corresponding parts in all views.

Fig. 1 is a broken side elevation of one of the spar members.

Fig. 2 is a broken cross section showing the connection between the truss members and ribs.

Fig. 3 is a cross section through one of the truss cords on the line 3—3 of Fig. 1.

Fig. 4 is a broken perspective view illustrating the rib connections of the wing.

Fig. 4ᵃ is a diagram showing an arrangement of the wing ribs and braces.

Fig. 5 is a section on the line 5—5 of Fig. 1, and

Fig. 6 is a section through a spar strut on the line 6—6 of Fig. 2.

Each spar is composed of upper and lower members 10 and 11 which taper from the center toward the ends and each cord member comprises an outer channel 12, which is preferably U-shaped in cross section and an inner shallower channel 13 of conventional shape, these being riveted or otherwise fastened together at their meeting parts, as shown at 14 in Fig. 3. Thus the cord members are very light, can be made of conventional stuff and are exceptionally strong. The cord members of the spar are trussed or braced by diagonally disposed struts 15, each of which comprise a sheet 16, which is longitudinally corrugated as shown at 17 to stiffen it, and the sheets 16 are connected together in the center by rivets 19 (see Fig. 6), which extend through spacing blocks 18. Obviously, the opposite sheets or plates 16 can be otherwise connected, if desired. Where the diagonally disposed struts meet as in Fig. 1, they are beveled so as to fit together nicely, and they enter the inner cord members 13 and are riveted to the widened parts 12′ of the cord members. They can be welded or otherwise fastened, if preferred, but riveting is the best practice. I have therefore shown rivets 21 extending through the sheets or plates 16 and through the parts 12′ of the cord members.

The spars are traversed by the upper and lower ribs 22 and 23 giving the desired wing contour and which are formed of channels 24 which give the desired lightness and strength and facilitate connecting with the other parts. These are stiffened by longitudinal corrugations 25 and are lightened by perforations 26 having flanges 27 around them to stiffen the channels, and compensate for the lightening. To further stiffen the ribs, the flanges of the channels are crimped at the edges as shown at 24′. The upper and lower ribs are placed in staggered relation, as shown, and where the ribs traverse the spars they are recessed, as shown at 28, in Fig. 2, so that the ribs set over the upper and lower edges of the spars and make a strong connection. To provide for this connection and to compensate for the weakening of the ribs by recessing, I preferably use gussets 29 which are riveted or otherwise fastened to the ribs and have angle flanges 30 extending around the recess 28 and firmly secured to the cord members, around which they snugly fit as the drawing shows. The ribs are braced by angle braces 31 although the braces can be of other cross section and the braces can be arranged in pairs, as in Fig. 4, to provide for the necessary stiffening. The ribs in the same plane can be also braced by transverse braces 32, which are perforated as shown at 33 to give the necessary lightness. If desired, a pair of ribs in the same plane, that is either upper or lower ribs can be connected to a rib in another plane by groups of braces 31 and the braces 31 can be omitted from the next pair in the same plane. This is illustrated by the diagram in Fig. 4ᵃ where two pairs of ribs 23 are shown connecting with ribs 22 above, while the nearest ribs of said pairs are braced by the member 32 only. This makes a strong construction, reduces the number of braces and makes for lightness.

It will be noticed that in this construction it is a simple matter to build up a spar of any desired number of the units shown which will be in effect a corrugated composite spar very light and unusually strong. It will be seen that the meeting parts of the adjacent cords can be riveted or fastened together as shown in Fig. 2, and the size of the gussets 29 and of the rib recesses 28 are made to suit the thickness of the composite spar.

From the foregoing description, it will be seen that I have produced a wing construction which is very light and simple but which is enormously strong.

I claim:

1. A wing construction comprising spar members, each having upper and lower chords formed of spaced channel members with their side portions united and struts connecting said chords, upper and lower cross ribs in staggered relation recessed to fit over the upper and lower parts of the spar members and gussets connecting the rigs and spars.

2. A wing construction comprising spars, having chords of spaced channels nested one within the other and with their side portions united, and struts connecting said chords, upper and lower cross ribs in staggered relation recessed to fit over the spars, gussets connecting the cross ribs to the cord members of the spars, and diagonal braces connecting the upper and lower cross ribs.

3. A wing construction having spars, upper and lower cross ribs of sheet metal channels in staggered relation connected to the spar members, diagonal braces connecting the upper and lower ribs, and sheet metal braces between the upper ribs and also between the lower ribs.

4. In a wing structure, a spar composed of a plurality of units each having chords comprising an outer generally U-shaped channel and an inner shallow channel, the two channels having their side parts fastened together, and struts connected to the inner channel and connecting the cords with the cords of the units lying side by side and united along their meeting parts.

5. In a wing construction, a spar according to claim 4 further characterized by tapering towards the ends.

6. In a wing construction, a spar according to claim 4 further characterized by tapering as a whole towards the tips and by the fact that the cord members of the spar and the struts individually taper.

In testimony whereof, I have signed my name to this specification this 18th day of April, 1927.

EDMUND B. CARNS.